July 21, 1942.    H. M. KECKLEY    2,290,753
REMOTE TALLYING
Filed June 26, 1939    2 Sheets-Sheet 1
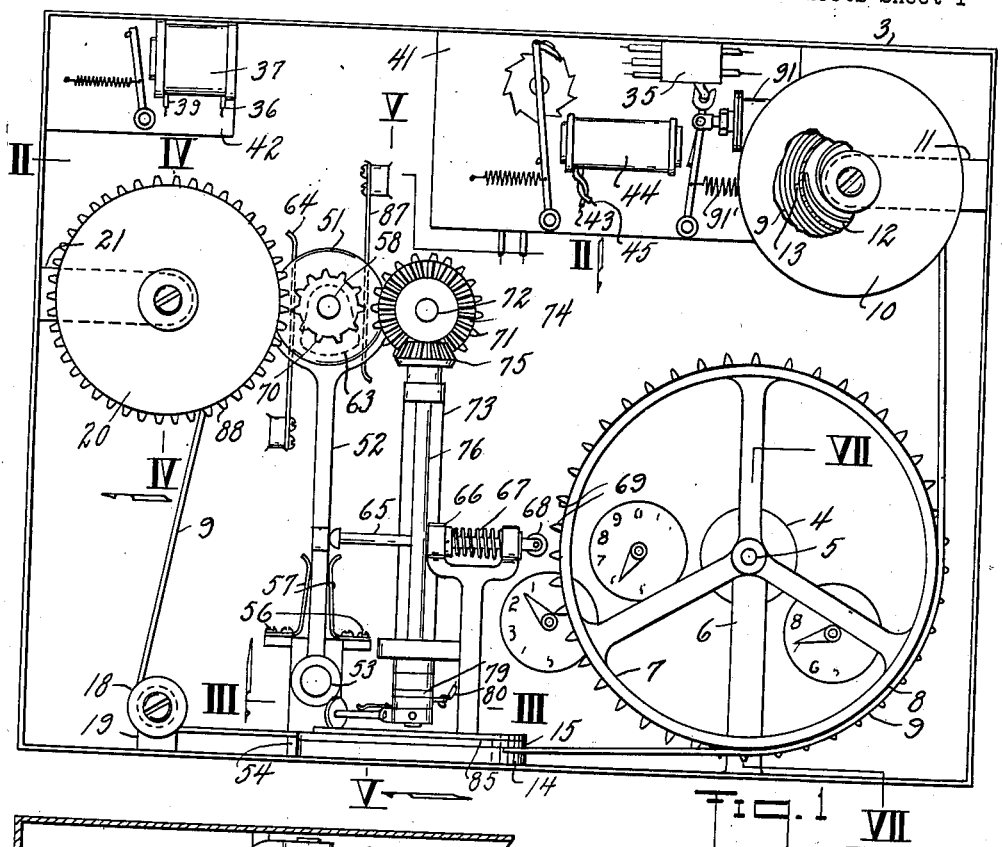
Inventor
Harold M. Keckley
By
Attorney July 21, 1942.  H. M. KECKLEY  2,290,753
REMOTE TALLYING
Filed June 26, 1939  2 Sheets-Sheet 2
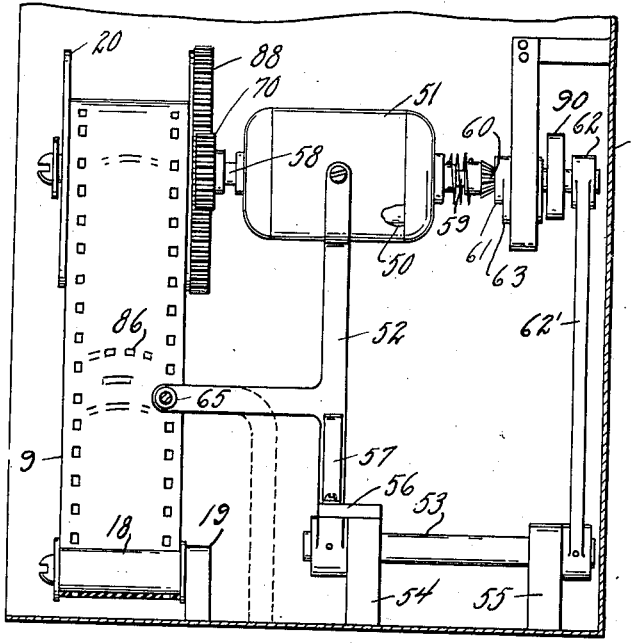
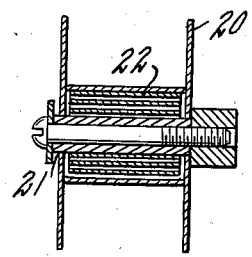
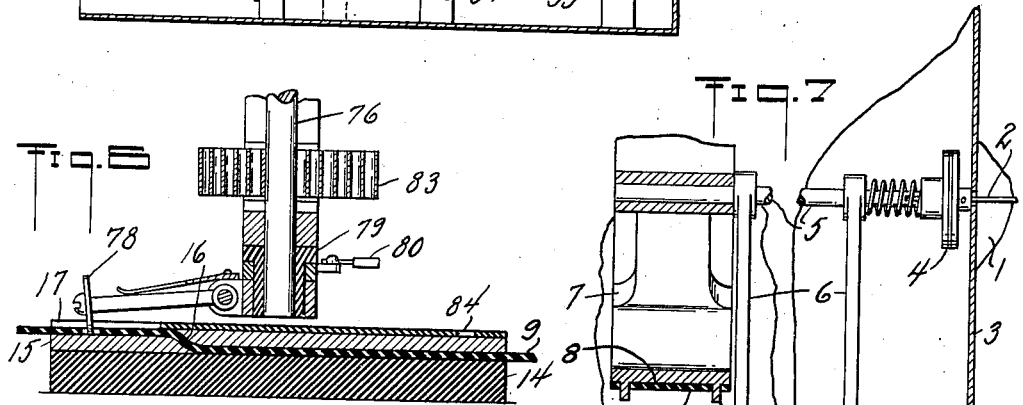
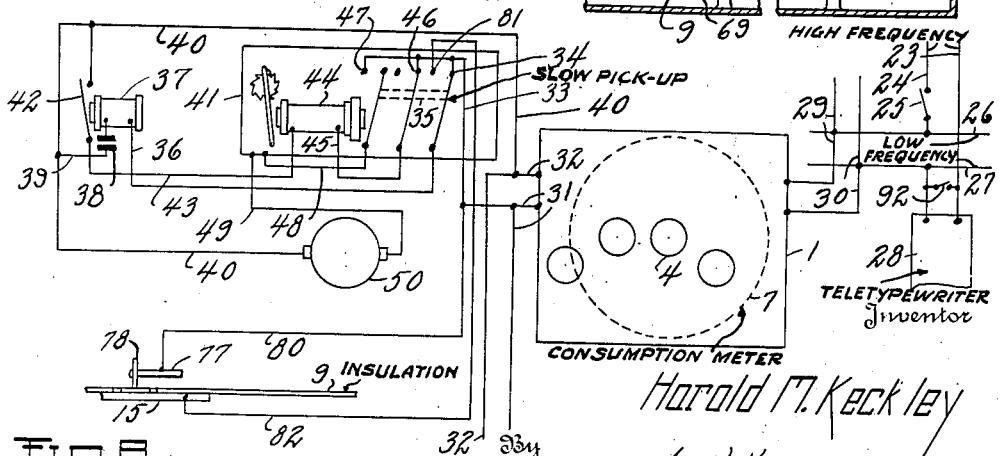
Inventor
Harold M. Keckley
Attorney Patented July 21, 1942

2,290,753

UNITED STATES PATENT OFFICE 2,290,753

REMOTE TALLYING

Harold M. Keckley, Fort Jennings, Ohio

Application June 26, 1939, Serial No. 281,069

3 Claims. (Cl. 177—380)

This invention relates to ascertaining various remote conditions and reports, say as to the position of the recording elements in a meter or the extent to which a meter has been operated to show consumption.

This invention has utility when incorporated in a central office or central station adapted for selective reading of meters, say electric meters and billing therefor.

Referring to the drawings:

Fig. 1 is a view in side elevation, with parts broken away, of a device for reporting the tally or reading condition of the meter;

Fig. 2 is a section on the line II—II, Fig. 1, showing features of the tally reporting or report-effecting mechanism;

Fig. 3 is a view on the line III—III, Fig. 1, showing in plan features of this tally reporting device;

Fig. 4 is a view on the line IV—IV, Fig. 1, of the tape supply reel for this tally recording means;

Fig. 5 is a section on the line V—V, Fig. 1, showing mechanism in connection with controls for locating the totalized readings of this tally device;

Fig. 6 is a section on the line VI—VI, Fig. 3, but showing the tally device in operating position;

Fig. 7 is a section on the line VII—VII, Fig. 1, showing the meter actuated wheel mounting for operating the tally sheet; and Fig. 8 is a wiring diagram showing the features of the inter-related electric control.

In accordance with the invention herein, at various remote stations, meters 1 may be located, from the housing of which may extend shaft 2. In the instance the meter be an electric meter, this shaft 2 (Fig. 7) may be the 100 kilowatte hour shaft extending into housing 3 and there connected by friction clutch 4 with shaft 5 mounted in bearings 6 in providing a drive from the meter to serve as a meter transmitter. Fixed on this shaft 5 is wheel 7 having way 8 for a signal channel comprising tally disclosing tape means 9. This tape 9 may have its used or record forming portion wound on reel 10 as mounted on the bearing 11 in the housing 3 (Fig. 1). Torsion automatic recovery spring 12 normally effects return or self-rewinding of this tape 9 on this reel 10 as tension is slacked back therefor. This tape 9 has its terminal 13 fast with this reel 10 in thereby determining the limit of unwinding therefor. This tape 9 as to the reel 10 has passed in guide 8 of the wheel 7 (Fig. 7). This tape 9 is insulated or of non-conductor material, and passes over block 14 (Fig. 6) under conductor 15, having cross-over way 16 from exposed way portion 17. This is from idler or guide pulley 18 (Fig. 1) in bracket 19 (Figs. 1, 5) in the housing 3. To this bracket 19 the tape 9 comes from reel 20. This reel 20 is in fixed bearing 21 mounted with the frame or housing 3 and has connected thereto a rewind spiral spring 22 reverse from the spring 12 (Fig. 4). Reel 20 is for the unused supply of tape to return as a record of meter readings to the reel 10.

At central control or central station, there may be electric conductor lines 23, 24 (Fig. 8), for a predetermined high frequency, say 10,000 cycles. Switch 25 may be closed. This places this high frequency on lines 26, 27, of the normal power circuit, say 110 volt, 60 cycle, or other power consumption circuit on which the meter may be located.

At the central or control station may be located record marking or disclosing means 28 say of the teletype character providing a reporter. The closing of the switch 25 is thus effective for imposing on the power circuit a high frequency current independently of disturbing such power circuit. The power circuit is shown as having branches 29, 30, to various locations and accordingly to independent meters 1, which as passing through the meter 1 may be as consumption lines 31, 32, in service for operating motors, lighting, or other use purpose. This selective frequency is independent of the power circuit and includes control means rendered effective by cutting in of the switch 25 to connect line 31 by line 33 to terminal 34 at switch 35, thence by line 36 to coil 37, thence past condenser 38 and by lines 39, 40, back to the line 32. Closed switch 92 complete the circuit for the switch device 25 to be operable on a call or dialing basis for operating under the code or counting system. Thereafter the switch 92 may be opened to cut in the teletype element 28. The coil 44 (Fig. 1) has two way armature. One may operate the counting or meter selecting device 41 through the pawl and ratchet. The other may operate or throw switch 35. The action of the armature for throwing the switch 35 is restricted by dash pot device 91. When the coil 44 is energized for a relatively short period of time, the armature actuates the pawl to move the ratchet wheel, but does not throw the switch 35 due to the retarding action of the dash pot 91. This means that short intervals of energization of the coil 44 are effective only for the meter selecting device 41. A relatively longer energization throws the switch 35, overcoming the resistance of the dash pot 91. This throwing of the switch 35 by the sustained impulse is to follow after the desired meter has been selected by the short impulses. The switch 35 operable from the disclosing means therefore serves as means responsive to the received code to energize the motor 50 at the meter selected and at that meter only, thereby connecting code sensing means to a signaling channel. This position of the switch 35 connects the line 32 over the line 40 to the motor 50 with the current supplied by the line 49 through contact as closed in the meter selecting device 41, thence over the line 48 by way of the thrown switch 35 to the terminal 47, the line 33 to the line 31, in thereby completing the power circuit.

The motor 50 in housing 51 (Figs. 1, 2, 5) is mounted on arm 52 carried on rock shaft 53 mounted in bearings 54, 55, in this housing 3. Brackets 56 from the bearing 54 have upstanding springs 57 yieldably holding the arm 52 in medial upright position. The motor in the housing 51 has high speed shaft 58 protruding from one end of the housing 51 and slow speed shaft 59 protruding from the remote end of the housing 51. This speed reduction operating the slow speed shaft 59 is effective through helix or screw to wind clutch member 60 in complementary clutch 61 mounted in bearing 62 carried by arm 62' from the rock shaft 53 to be effective in rotating cam 63 at a relatively slow speed. This cam 63 thus acts on spring arm 64 against the action of the springs 57, tending to rock the housing 51 with the axis shaft 53 in the bearings 54, 55.

In this operation the arm 52 (Fig. 1) abuts plunger 65 in bracket 66 and thrusts such against the resistance of spring 67 to hold roller 68 against teeth 69 in the wheel 7. There is thus provided meter control means selectively positioning the tape means at an appropriate register position. These teeth 69 form the track 8 for the tape 9. There is accordingly holding of this wheel against driving action of the clutch 4 at the instant the motor housing 51 is rocked to bring its shaft 58 with toothed friction pulley 70 into mesh with gear 71 on shaft 72 (Figs. 1, 2) mounted in bearings 73 from the housing 3. Fixed with this gear 71 is beveled gear 74, thus thrown into driving engagement from this gear 70 to drive beveled gear 75 on vertical shaft 76 having mounted thereon radial arm 77 terminally carrying contactor 78.

Insulation mounting 79 (Fig. 6) provides electrical insulation of this contactor 78 from the shaft 76, thus connecting line 80 (Figs. 6, 8) with line 31 for completing circuit in by-passing the motor 50 and the device 41 as to one side. The conductor 15 has connection 82 to terminal 81 at the switch 35, thereby completing the circuit from the other side. Mounted on the shaft 76 is spiral torsion spring 83 which may be wound say for as many as three or more rotations, thus permitting the shaft 76 to make rotations and the yieldably thrown contactor 78 to travel in the tape 9 and transmit, clear of opening 78' for the teeth 69 due to holding registry of the roller 68, the code reading as totalized in the tape, say for 485 kilowatt hours, and likewise give meter identification through additional ordinal code reading 84 (Fig. 3) as disclosed by disk 85 in the transit range for the cycle of rotation travel of this contactor 78. Here is response effective means in this mechanism for meter identification and meter reading at the marking station to and from which the tape is handled by the tape feeding mechanism. In the event this be for more than one rotation, say up to three rotations, there may be thus code identification 84 repeated the three times and code notation 86 on the tape 9 likewise repeated three times, and such transmitted in the power circuit line back to the teletype device 28 for the station reading, at which instrument the teletype is means responsive to a received code and may be effective not only as a totalizer for the totalizing of the amount as in kilowatt hours but for computing the billing for the consumer of such in dollars and cents, or notation of the cost according to the monetary units adopted. Effective functioning is thus had of this code sensing means.

This reading in the interval of the rocking is a locking means of the cam 63 for the positioned tape means. However, it is not one discontinuing the operation of the motor 50, for as the cam 63 continues its course there is shifting away from the spring 64 and against opposite spring 87 (Fig. 1). A sequential control of this locking means of the cam 63 is from the motor means 50. This allows the spring 67 to withdraw the roller 68 from the holding position as to the wheel 7 at once the reading or tally has been effected. Furthermore, in this rocking of the motor housing 51 on the arm 52, the rubber or friction gear 70 shifting away from the gear 71 is now in mesh with gear 88 (Figs. 1, 2, 5). This gear 88 is fast with the reel 20 and results in a recover winding of the supply of the tape 9 from the reel 10 so that such tape 9 is fed back about the released wheel 7 as permitted by the clutch 4 and through the way under the disk 85 about the idler wheel 18 for full traverse back to rewind the used or unused record providing tape 9 on the reserve reel 20. As this recover operation is completed, any attempt of the motor 50 to wind further merely stalls this motor. The installation is thus in readiness for the used tape to be filed as a record upon removal from the reel 10 and a replenishing charge of unused tape 9 to be supplied on the reel 10, wound therefrom to the reel 20, thereafter for the controls to be effective in the feed device release and marking oprations. The recovery action of the tension spring 91' then pulls the switch 35 away from the armature of the now de-energized coil 44. The dash pot 91 delays the pulling back of the switch 35 for the elapsing of a time interval. Then the switch 35 is finally snapped back into the position of starting (Fig. 8). This return position of the switch 35 opens the circuit for the motor 50 and closes the circuit for the coil 44, thereby placing the tuned or high frequency coil 37 again directly across the power lines 31, 32 (Fig. 8) and in readiness for a subsequent meter selection program hereunder.

The motor 50, as thus idle, is caused by the spring 57 acting thereon to swing back to normal idle position and this with the automatic unclutching between the elements 60 and 61. The gear 70 is accordingly free from the gears 71, 88, and the recover spring 83 has theretofore brought the contact 78 to position of rest at the clear region 89 (Fig. 3) on the disk 85. There is disconnecting of this tally disclosing unit away from the power elements and the equipment at the central station is in readiness for taking a selective other remote reading as may be in order. These readings may be taken in sequence or selectively under the dialing system as may be found appropriate.

For resetting the cam 63 in its normal mid idle position, torsion spring 99 is mounted on the bearing 62. In the operation of the arm to throw the switch 35, such has been described by the holding-in of the switch 25. The period for time interval for this holding-in may in practice be resisted by dash pot 91. This means that the casual placing of the switch 25 may be a function for even dialing or counting location for selecting various meters in advance of the connection for having the reporting functions effective, when brought about by having the switch 92 closed to permit this functioning independent of the teletype device 28.

From the foregoing, it is to be noted that in the disclosure hereunder the roll 68 as engaging the wheels 7 between the teeth 69 locks such roller in position of rest for the functioning of the contactor 78 for the transmission of the code signal 86 incidental with the identification signal 84 for such meter. The locking of the wheel 7 so places the code 86 that the contactor 78 rides clear of the opening 78'. Accordingly, the openings 78' serve only as registrations for the teeth in insuring the progress of the tape 9. This locking of the wheel 7 is against the functioning of the clutch 4. Therefore, at once the roller 68 releases the wheel 7 the parts are in normal position for functioning in the recover and then again for the winding operation.

What is claimed and it is desired to secure by United States Letters Patent is:

1. A meter transmitter for a signalling channel comprising a tape means with a plurality of ordinal codes recorded thereon, meter controlled means selectively positioning said tape means, a code sensing means, a locking means for locking said meter controlled means, motor means sequentially controlling the said locking means and the code sensing means respectively, means responsive to a received code energizing said motor means and connecting said code sensing means to a signalling channel.

2. A meter transmitter for a signalling channel comprising tape means with a plurality of ordinal codes recorded thereon, there being actuation connection from the transmitter tending normally to progress the tape means, meter controlled means selectively positioning said progressed tape means for code disclosure register, code sensing means, locking means for locking said meter controlled means, motor means sequentially controlling the said locking means and the code sensing means, respectively, and means responsive to a received code energizing said motor means and connecting said code sensing means to a signalling channel.

3. For electric current consuming circuit including an electric meter therein, a meter transmitter therefrom for a signalling channel comprising tape means with a plurality of ordinal codes recorded thereon, there being actuation connection from the transmitter tending normally to progress the tape means, meter controlled means selectively positioning said progressed tape means for code disclosure register, code sensing means, locking means for locking said meter controlled means, motor means sequentially controlling the said locking means and the code sensing means, respectively, and, imposable on said circuit, means responsive to a received code energizing said motor means and connecting said code sensing means to a signalling channel.

HAROLD M. KECKLEY.